A. H. KEHRHAHN.
MACHINE FOR TREATING HIDES OR LEATHER.
APPLICATION FILED JAN. 26, 1910.
1,053,297.
Patented Feb. 18, 1913.
4 SHEETS—SHEET 1.
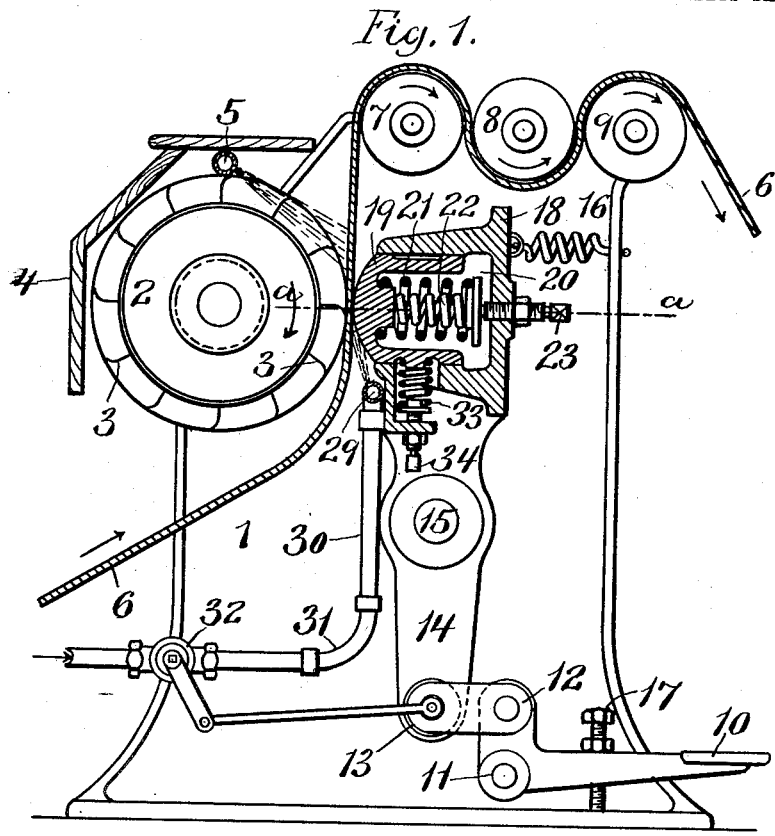
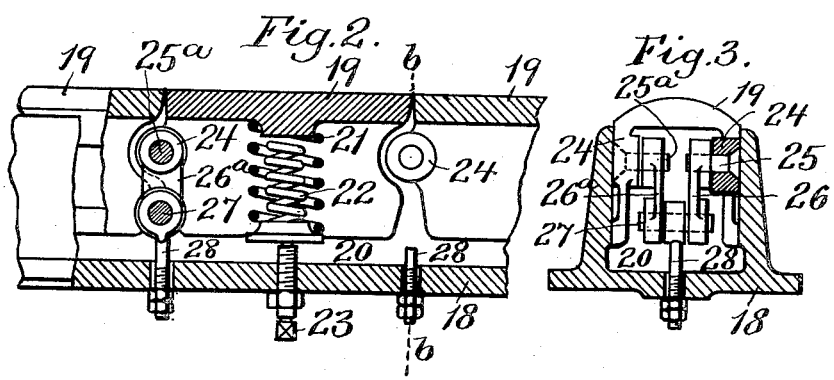
Witnesses:
H. L. Allen
F. R. Roulstone
Inventor.
A. H. Kehrhahn A. H. KEHRHAHN.
MACHINE FOR TREATING HIDES OR LEATHER.
APPLICATION FILED JAN. 26, 1910.
1,053,297.
Patented Feb. 18, 1913.
4 SHEETS—SHEET 2.
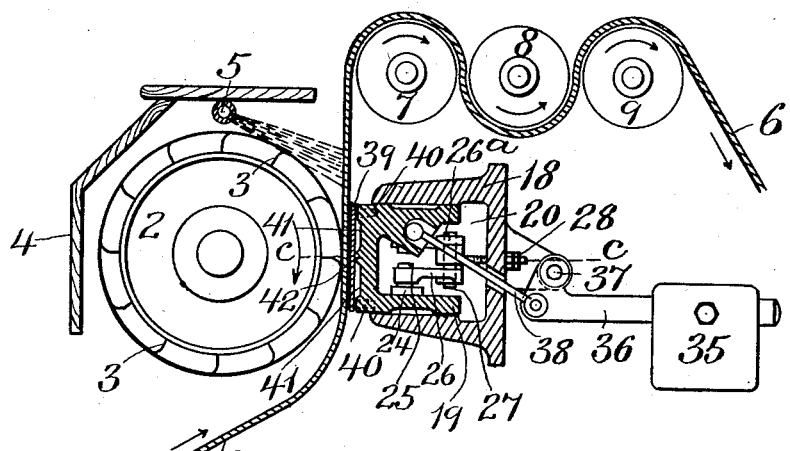
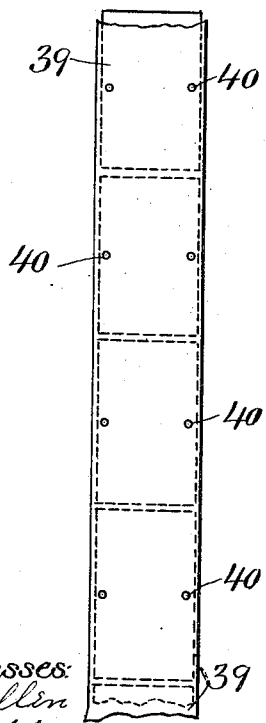
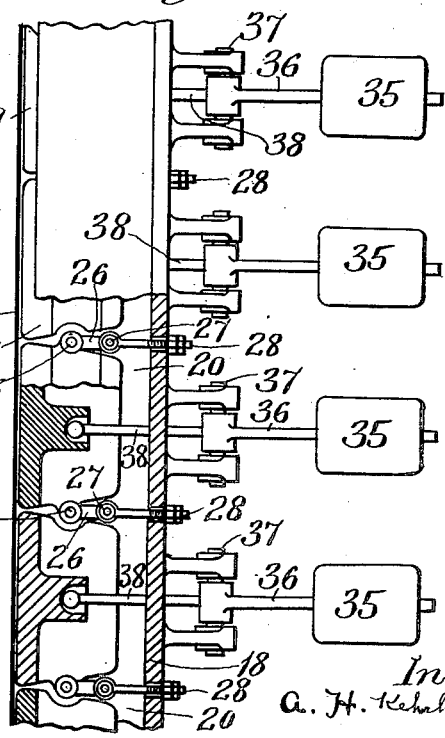

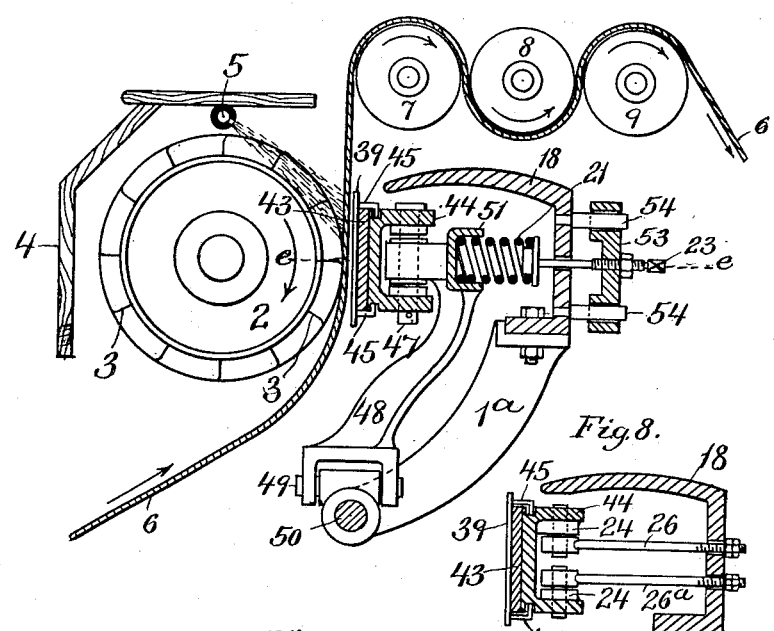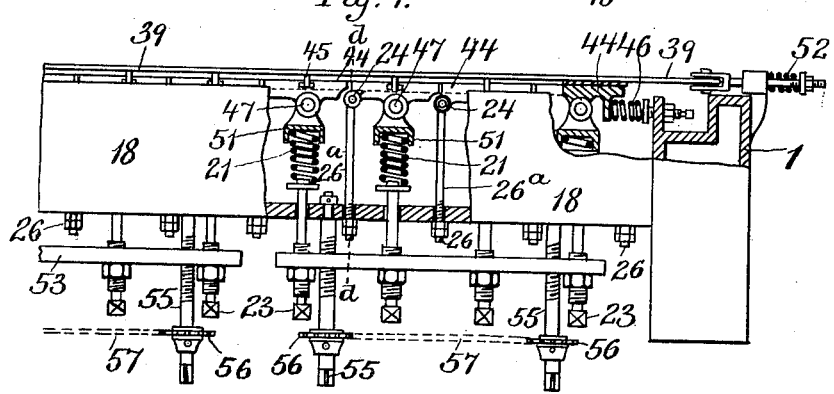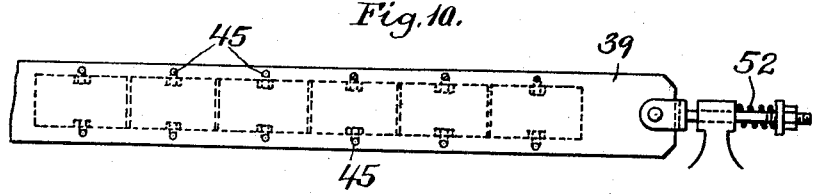

A. H. KEHRHAHN.
MACHINE FOR TREATING HIDES OR LEATHER.
APPLICATION FILED JAN. 26, 1910.
1,053,297.
Patented Feb. 18, 1913.
4 SHEETS—SHEET 4.
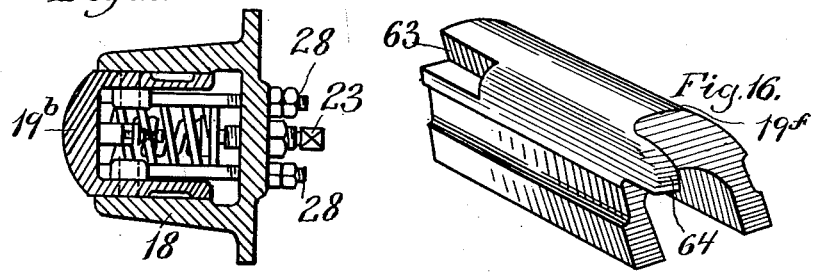
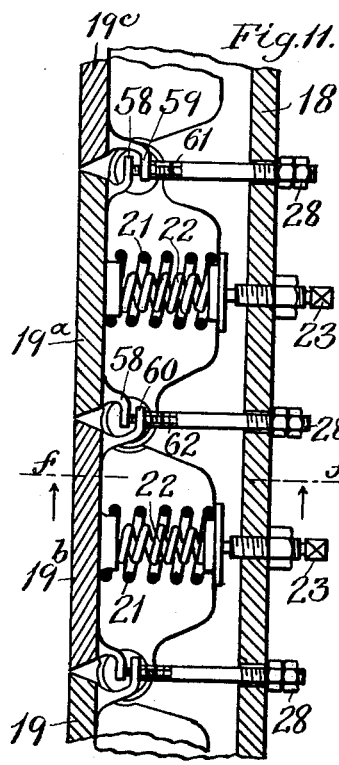
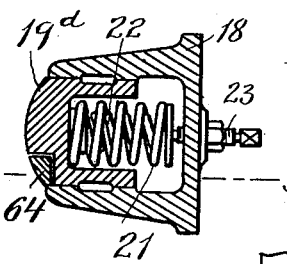
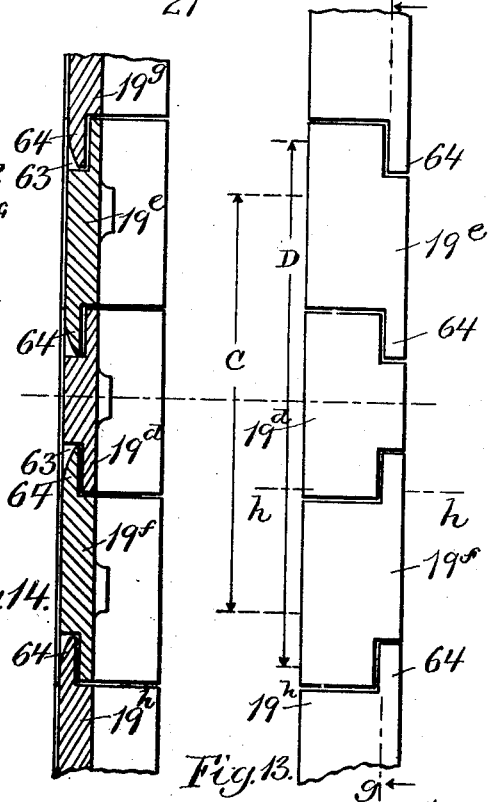
Witnesses:
H. L. Allen
F. R. Poulstone
Inventor:
A. H. Kehrhahn
by
Attys.

UNITED STATES PATENT OFFICE.

ALEXANDER HEINRICH KEHRHAHN, OF FRANKFORT-ON-THE-MAIN, GERMANY.

MACHINE FOR TREATING HIDES OR LEATHER.

1,053,297.　　　　Specification of Letters Patent.　　Patented Feb. 18, 1913.

Application filed January 26, 1910. Serial No. 540,239.

*To all whom it may concern:*

Be it known that I, ALEXANDER HEINRICH KEHRHAHN, of Frankfort-on-the-Main, Prussia, Germany, have invented certain new and useful Improvements in Machines for Treating Hides or Leather, of which the following is a specification.

This invention relates generally to machines for fleshing, unhairing, scudding, setting, shaving or similarly treating hides or leather, but more especially to that class of machines wherein revolving working cylinders are fitted with helical blades or knives. In these machines, the hide is pressed against the working cylinder by means of a bed or bolster which is usually made of or covered with india rubber, which obviates defects due to differences in the thicknesses of the hides.

The principal object I have in view to accomplish is to provide a bed or bolster, mainly characterized in that the sections composing the same are capable of individually yielding and in that they so coöperate with each other as to avoid the formation of steps or sharp edges between adjacent sections while in operation, and at the same time secure more uniform pressure on the hide or material under treatment.

Another object is to provide for the individual sections of the bed or bolster to be yieldingly pressed toward each other so as to avoid the formation of any gap between them.

Another object is to provide for the position of the sections being adjusted with reference to the working cylinder.

Another object is to provide for the pressure to be exerted by the sections being adjusted for each section either individually, collectively or in groups.

Another object is to provide a machine wherein an intermediate metallic or other suitable band is interposed between the bed or bolster and the working cylinder.

Another object is to provide a special system of anti-vibrating springs for pressing the sections of the bed or bolster against the material under treatment.

Another object is to provide a device for sprinkling the material while under treatment.

Other objects and advantages will be made to appear in the following specification. One of these advantages is that, by means of the sprinkling device, the hide or material to be acted upon is capable of slipping or gliding with the greatest ease against its bed or bolster both lengthwise and crosswise.

In the accompanying drawings, Figures 1, 2 and 3 show one construction, Fig. 1 being a longitudinal elevation partly in section, Fig. 2 a horizontal section along the line *a a* of Fig. 1, and Fig. 3 a section along the line *b b* of Fig. 2. Figs. 4, 5 and 6 show a modified construction, Fig. 4 being a longitudinal elevation partly in section, Fig. 5 a separate view of the metallic band, and Fig. 6 a section along the line *c c* of Fig. 4. Figs. 7, 8, 9, and 10 show another modified construction, Fig. 7 being a longitudinal elevation partly in section, Fig. 8 a section plan on line *d d* of Fig. 9, Fig. 9 on a smaller scale, a section along the line *e e* of Fig. 7 and Fig. 10 a detail of Fig. 9. Figs. 11 and 12 show another modified construction of sectional bed or support, Fig. 11 being a sectional top view and Fig. 12 a section along the line *f f* of Fig. 11. Figs. 13, 14, 15 and 16 show another modified construction of sectional bed or support, Fig. 13 being a top view of portion of the bolster, Fig. 14 a section on line *g—g* of Figs. 13 and 15, Fig. 15 a cross section through one section, say at *h—h* Fig. 13 and the beam, and Fig. 16 is a perspective view of one of the sections.

Referring to the fundamental form of construction shown in Figs. 1, 2 and 3, the frame 1 supports the working cylinder 2, which is equipped with helical blades or knives 3 and has the usual cover 4 and sprinkling tube 5. The hide or material 6 is pulled past the working cylinder, either manually or mechanically as in the ordinary manner, and passes over rollers 7, 8 and 9, of which the middle one 8 can be lifted up by the means commonly employed for allowing the hide 6 to be thrown in. The bed or bolster to be hereinafter described may be pressed automatically against the hide by means of any suitable mechanism, but preferably by means of the herein shown contrivance consisting of a treadle 10 pivoted at 11 and connected to a link 12 which in turn is connected by a pivot 13 to one of a plurality of rocking arms such as that indicated at 14. The rocking arms are fitted on a transverse shaft 15 suitably mounted in the frame 1 and a spring 16 tends to pull the bolster away from the hide 6 unless the operator happens to be depressing the treadle 10 for causing the bolster to move against the said hide. A set screw 17 abutting against the frame enables the throw of the treadle to be regulated.

In a beam 18 integral with or connected to the rocking arms 14 is formed a recess for the reception of a series of independently yielding sections composing the bolster which I will now proceed to describe.

Each section 19 is fitted to slide freely in the recess 20 and is normally pressed outward against the hide 6 by a special arrangement of springs 21, 22, the tension of which can be adjusted by a set screw 23. At each end, each section is provided with a boss 24 in such a manner that the boss of a given section is opposite the boss of the adjacent section as will appear from Fig. 3, wherein the bosses facing each other are shown one in external view at the left, and the other in section at the right hand side of the figure, the one represented in external view belonging to the section entirely illustrated, while the other presented in section in said Fig. 3 belongs to the adjacent section. Into the openings of the bosses 24 are fitted studs 25, 25$^a$ respectively, on to the internal ends of which are slipped links 26, 26$^a$. In turn, these links are connected by a stud 27 to an adjustable screw 28, passing freely through the beam 18, so that the sections can be adjusted separately and successively with reference to the working cylinder 2. It will be seen that by pivotally connecting the said sections together, they necessarily displace themselves in unison, whereby the adjoining edges of adjacent sections are prevented from forming steps or sharp edges which would be detrimental to the hide or other material under treatment. It will also be seen that as the pivots 25, 25$^a$ are in the same vertical plane as that passing through the adjoining edges of adjacent sections, the end of the section which for the time being is depressed would, when pivoting around 25, move into the path of the working cylinder 2 and thus give rise to damage, is prevented from doing so. In both these instances, the acting faces of any two adjoining sections remain, so to speak, in a line with, or at slight angle to each other.

In order to provide for the easy slipping or gliding of the hide or material to be acted upon in the machine, I provide a sprinkling device which throws water between the hide 6 and the bolster. This is essential, especially so when the hides are fleshed from the soaks, in view of the fact, that the hair prevents the hide from slipping easily past the bolster and especially from spreading sidewise. By means of this device, the hide slides easily, the water filling the spaces between the hair and forming, so to say, an additional bolster. The said device is composed of a perforated tube 29 to which water under pressure is fed from any suitable source by pipe 30. A flexible piece of tube 31 enables the sprinkling device to readily follow the movements of the bolster. In order to avoid waste of water, the device is controlled by a valve 32 which is connected to the treadle 10 so as to automatically cut off the water supply when the bolster is away from the working cylinder, that is, in its inoperative position.

In order to prevent any vibrations of the sections, which would have for its result to show marks on the hide or material under treatment, I employ the special arrangement of springs 21, 22 above referred to, having different durations of vibration, but about equal strength, so that the vibrations of one are compensated by the vibrations of the other.

In order to prevent excessive looseness and vibration of the sections in their beam 18, I may use a contrivance consisting for instance of a spring 33, the tension of which may be regulated by a set screw 34, whereby friction may be set up between the upper face of the sections and the internal wall of the beam 18, which friction may be controlled at will.

Instead of using one spring for each section, one single bar might be used which could be made to bear elastically on a group or groups of sections.

It will be readily seen that a bolster constructed as hereinbefore described has the following advantages: When once the distance of the bolster from the working cylinder has been roughly determined by the screws 28, the sections may be more precisely adjusted in accordance with the thickness of the hide or material to be acted on. Furthermore the pressure applied to the beam 18, whether by foot or otherwise can be divided or distributed over the length of the hide by means of the screws 23 in accordance with the hard or soft parts of the same, such as butt and bellies.

Referring to the modified construction in Figs. 4, 5 and 6, the same reference letters are used to designate corresponding parts of the foregoing construction. In this instance, in lieu of compensating springs, I employ a positively acting contrivance, consisting of a weight 35 answering a twofold purpose. The weight 35 is adjustably mounted on an arm 36 which is pivoted at 37 and is provided with a link 38, the free end of which is spherical, so as to fit into a correspondingly shaped recess of the sections 19. It will be readily understood that, in addition to pressing the section outward of the beam 18, the weight will also tend, in view of the inclined position of the link 38, to generate friction between section and beam, and thus avoid vibration in the same manner as by the use of a spring 33 in the construction shown in Fig. 1.

As an alternative contrivance for preventing the formation of steps or sharp edges between adjoining sections, I may interpose a metallic band 39 such as steel between the bolster and the hide 6. The band may be connected to the sections by means of pins 40. The acting face of the sections is recessed at 41, 41 so as to leave in the middle a rib 42 and thus reduce the area of the hide surface acted on by the blades of the working cylinder. The band acts to bridge any gap that may be formed between adjacent sections of the bolster in the event of the sections not being pivotally connected together as previously described.

Referring to the modified construction shown in Figs. 7, 8, 9 and 10, wherein the same letters of reference are used to designate like parts, I replace the sectional bolster hereinbefore described by a soft bolster 43 of any suitable material and either solid or pneumatic, which is interposed between the metallic band 39 and a suitable sectional or other support 44 and I anchor the metallic band of the said support by means of hooks 45 or other equivalent means, the bolster being firmly held thereby. In this instance, there has not been shown at least in Fig. 7 any pivotal connection between the sections of the support, as such connection may, as hereinbefore stated, be dispensed with in cases where a metallic band is used. Such pivotal connection may however still be retained as is for instance shown in Figs. 8 and 9.

In order to prevent the formation of any gap between the supports 44 of Figs. 7 and 9 or between the sections 19 of Figs. 1, 2, 3 and 4, 5, 6 respectively, the said supports or sections are placed under compression by means of springs 46 acting against the two extreme supports or sections, as shown for instance in Fig. 9, a smooth support being thus afforded without any liability of any chips finding their way between adjacent sections. The sectional supports 44 are mounted on a stud 47 fitted into an arm 48 which is connected to brackets 1ª by transverse axes 49 50 constituting a universal joint. A socket 51 receives a spring 21 or compensating springs as already stated, the pressure of which can be regulated as hereinbefore described by a screw 23. The axis 50 requires to lie substantially in a vertical plane passing along the line of contact between the hide 6 and the metallic band 39, so that the supports 44 practically move for a short distance in an extension of the radius of the working cylinder 2. The universal joint permits sufficient lateral motion to the supports or sections, so that the said supports or sections keep close together under the pressure exerted by the compression springs 46.

In order to keep the metallic band 39 stretched over the bolster, it is subjected to the action of adjustable tension springs 52 on each side of the machine, as shown in Figs. 9 and 10.

The combined effect of the weights 35 (Fig. 4) or springs 21 22 (Fig. 1) with the tension put upon the metallic band 39 by the springs 52 produces a very delicate and sensitive pressure on the hide 6. If to this good effect is added the advantage resulting from the use of a rubber bolster (as 43) which allows for local differences in the thickness of the material to be treated, a most perfect support for the said material is secured.

In order to secure good results in the case of a bolster composed of sections, it is important that the pressure to be exerted by the sections may be quickly and accurately adjusted for the different sorts of hides or materials to be operated on; and as the sections must not be long, a machine for working large hides would require a great number of sections to be adjusted individually. I provide simple and practical means for securing this result, as illustrated in Figs. 7 and 8, wherein the pressure screws 23 are fitted, either all of them together or groups of them, in a pressure bar 53 which is capable of sliding upon guide-rods 54 Fig. 7 fastened to the beam 18. Into the pressure bar 53 are screwed a pair of rods 55, one end of each of which is mounted on, and capable of rotating in, the beam 18, while the other end of each carries a chain-pulley 56, both pulleys being connected by a chain 57. By imparting rotary motion to one of the rods 55, the pressure-bar is caused to move inwardly or outwardly with the result that the corresponding screws 23 are carried along and cause the pressure of all the sections to be changed uniformly, simultaneously and quickly.

Owing to the employment of an interposed metallic band as described with reference to Figs. 4 to 6 and to Figs. 7 to 10, it is possible to make use of non-revolving soft rubber bolsters. Without a metallic band, stationary rubber bolsters wear out very soon in consequence of the friction of the hide pulled over them; in addition to this, the pull on the hide, necessary for moving it over a naturally rough rubber bolster, is a cause of deterioration of the fibers thereof. The principle of an interposed metallic band is therefore a great advantage.

Referring to the modified construction shown in Figs. 11 and 12, the same reference letters are also used to designate corresponding parts of the previous constructions. It is not necessary that the sections of the bolster be pivotally connected together as in the constructions previously described, since it would be sufficient for them to be so connected together that the depression of an inner section will determine the depression of an outer section, while the depression of an outer section need not cause the depression of an inner section. To that end the sections may be connected as shown in this modification, wherein $19^a$ is assumed to be the middle section of a bolster, such middle section $19^a$ is provided with two lugs 58 58 occupying a position above corresponding lugs 59 60 on the adjacent sections $19^b$ $19^c$, the latter lugs being provided with adjusting screws 61 62 for regulating the height of the sections relatively to each other. It is to be observed that in the case of any two adjacent sections, the lugs at adjoining edges of such sections are so placed that the lug of an inner section is always above the lug of an outer section. In other respects the sections are constructed and arranged as in the constructions previously described. Assuming the middle section $19^a$ to be depressed, it will cause a depression of each adjoining section $19^b$ and $19^c$, whereas the depression of either adjoining section will not cause a depression of the middle one, but will only carry down the next outward section. It is possible to use this modification because the hide to be worked upon is always placed so as to cover with certainty the middle portion of the bolster. This fact is a consequence of the shape of the working tool in which the helical blades extend from the center to the ends of the cylinder.

Referring to the modified construction in Figs. 13, 14, 15 and 16 wherein the same reference numerals designate like parts, I have shown a system which makes it possible to make use of the hide itself as a means for causing two adjoining sections to coöperate with each other and prevent the formation of any step or sharp edges without necessarily pivoting the said sections together. In this construction $19^d$ is assumed to be the middle section of the bolster and has at each end a groove 63. These grooves are made off the center line of the bolster, on the side from which the hide leaves the sectional bed. The two sections to the right and left of the center sections $19^e$ and $19^f$ respectively are provided at their ends nearest to the center with projections 64 which fit into the grooves 63 in the central section. The farther ends of the sections $19^e$ and $19^f$ are provided with similar grooves 63 into which fit projections 64 on the adjacent sections $19^g$ and $19^h$ of the bolster. The shape of the projections 64 will be clearly seen from Fig. 14, which shows them sloping down from a line on a level with the surface of the section to a rounded point at their extremity. The depth of the grooves 63 must be such that when a section, say $19^d$, is depressed to the greatest extent required by the thickness of the hide, the tip of the projection 64 of section $19^e$ does not project above the surface of section $19^d$.

The operation of the above described device is as follows: Supposing the width of the hide under treatment to be equal to C (Fig. 13), it will cover and depress sections $19^d$, $19^e$ and $19^f$. Assuming the width of the hide to increase gradually, as is the case from the middle toward the shanks, the width of hide on the bolster will after a time be equal to say D and will begin to overlap the sections $19^g$ and $19^h$. The three central sections being depressed, the edge of the hide will come into contact with the surfaces of the projections 64 on the sections $19^g$ and $19^h$, and owing to their sloping form, will easily slide sidewise up them. The sliding motion of the hide will result in a depressing effect being exerted on the projections of sections $19^g$ and $19^h$, so that by the time the edge of the hide reaches the joints between sections $19^e$ and $19^g$ on the one hand, and sections $19^f$ and $19^h$ on the other hand, the sections $19^g$ and $19^h$ will have been depressed till their surfaces are flush with those of the sections $19^e$ and $19^f$ respectively. By this means no sharp edge or step is opposed to the edge of the hide when passing from one section to a section more remote from the center of the bolster. By this construction the advantage is gained that the pivoting together of the sections is made unnecessary, while the hide itself is used to cause the depression of a section in readiness to receive the hide.

Fig. 16 is a perspective view of one section of the bolster such as $19^f$, showing a groove 63 at one end and the sloping projection 64 at the other. It is of course immaterial whether the projections are on the one side or on the other, their length and shape being likewise immaterial. What is essential is that the projection of an outer section shall reach into the path of the material being treated on the next inner section so that the outer section is pressed down by the material through the instrumentality of such projection prior to the material being actually operated on.

I wish to be understood that I do not limit my invention to the specific construction shown, since these constructions have only been illustrated as instances of the best manners I am acquainted with for carrying the invention into practice. For instance, it will be possible without departing from the spirit of the invention, to provide, instead of the contrivances shown, viz. springs 33, Fig. 1 and weights 35 of Figs. 4 and 6, some suitable arrangement of checking device for counteracting the freedom of motion of the sections such as friction brakes, or hydraulic buffers or equivalent means.

Again in the event of it not being necessary to vary the pressure on the separate sections of a bolster a rubber or pneumatic bed might be used. Again instead of the compressing springs 46 of Fig. 9 for pressing the sections of the bolsters together it would be possible to replace such springs by tension springs arranged between each two sections and acting to pull the sections toward each other.

Having thus explained the nature of my said invention and described a way of making and using the same, although without attempting to set forth all of the forms in which it may be made or all of the modes of its use, what I claim is:

1. In a machine of the character referred to, a working member, and a bolster comprising a plurality of yielding sections having contiguous front edges, and means by which adjacent sections are connected to hold their contiguous front edges together to prevent the formation of shoulders or projections when the bolster is in use.

2. In a machine of the character referred to, a working member, and a bolster comprising a plurality of yielding sections, and means for yieldingly pressing said sections toward each other to prevent the formation of gaps between the adjacent sections.

3. In a machine of the character referred to, a working cylinder, a bolster comprising separate sections, and means for individually adjusting said sections with respect to said cylinder.

4. In a machine of the character referred to, a working member, a bolster comprising a line of yielding sections, means for moving said bolster toward and from said working member, and means for individually adjusting each section with respect to said working member.

5. In a machine of the character referred to, a working member, a bolster comprising a plurality of yielding sections having contiguous front edges and tilting connections between said sections whereby the movement of a front edge of one of them occasions equal movement of the contiguous edge of the next adjacent section.

6. In a machine of the character referred to, a working member, and a bolster comprising a plurality of yielding sections placed in alinement with their surfaces flush, and pivotal connections between the adjacent sections including pivots located in the vertical transverse planes passing through the meeting end edges of said sections.

7. In a machine of the character referred to, a working member, and a bolster comprising a plurality of yielding sections, a movable support for said bolster, individual pressure devices for said sections, and individual means for varying the pressure of said devices.

8. In a machine of the character referred to, a working member, and a bolster comprising a plurality of yielding sections, a movable support for said bolster, individual pressure devices for said sections, and means for varying the pressure of said devices collectively.

9. In a machine of the character referred to, a working member, and a bolster comprising a plurality of yielding sections, a movable support for said bolster, individual pressure devices for said sections, and instrumentalities for varying the pressure of said devices both individually and collectively.

10. In a machine of the character referred to, a working member, a bolster movable toward and from said working member, and a metallic band interposed between said bolster and said working member.

11. In a machine of the character referred to, a working member, a bolster movable toward and from said working member, and comprising a line of yielding sections, and a metallic band interposed between said bolster and said working member.

12. In a machine of the character referred to, a working member, a bolster movable toward and from said working member, a metallic band interposed between said bolster and said working member, and means for placing said band under longitudinal tension.

13. In a machine of the character referred to, a working member, a bolster movable toward and from said working member, a metallic band interposed between said bolster and said working member, and means for holding said band against displacement in lines transverse to its length.

14. In a machine of the character referred to, a working member, a bolster movable toward and from said working member, a metallic band interposed between said bolster and said working member, and a yielding cushion between said band and said bolster.

15. In a machine of the character referred to, a working member, a bolster movable toward and from said working member, and comprising a plurality of independent sections, a movable support for said sections, and means for producing friction between said sections and said support.

16. In a machine of the character referred to, the combination of a helically bladed cylinder, and a bolster comprising a plurality of sections pivotally connected at their adjacent ends, and means for yieldingly pressing said sections toward each other.

17. In a machine of the character referred to, a working member, a bolster comprising a plurality of yielding sections, said sections being connected in groups, a movable support for said bolster, individual pressure devices for said sections, and means for varying the pressure of the devices of one group independently of those of any other group.

18. In a machine of the character referred to, a working member, a bolster comprising a plurality of independent sections, a movable support for said sections, and friction means for damping movement of said sections.

19. In a machine of the character described, a working member, and a work support comprising a plurality of pivotally connected yielding sections.

20. In a machine of the character described, a working member, and a work support comprising a plurality of connected sections and springs, one exerting pressure against each section, to hold it toward the working member.

21. In a machine of the character described, a working cylinder, and a work support comprising a plurality of sections whose operative faces form a continuous work-supporting surface opposed to and at a normally unvarying distance from the working cylinder, and means for yieldingly supporting said sections to permit one or more of them to assume an angular position with respect to the others, and vary its distance from said working cylinder without destroying the continuity of said work-supporting surface.

22. In a machine of the character described, a rotary working member, and a work support for presenting the work to the action of said working member, and comprising a plurality of sections, and means for pivotally connecting said sections.

23. In a machine of the character described, a working cylinder, a work support comprising a plurality of sections with their faces normally tangential to said cylinder, and means for supporting said sections to permit said sections to assume angular positions with respect to each other.

24. In a machine of the character described, a working member, a work support comprising a plurality of separate sections having contiguous operative portions forming a substantially continuous surface, and means for permitting said sections to yield without destroying the continuity of said surface.

25. In a machine of the character referred to, a working member, and a work support comprising a plurality of sections with their work-supporting faces flush, and means for yieldingly supporting said sections to permit some of them to move to position where their faces are at an angle to the remainder of said faces.

26. In a machine of the character described, a working member, and a work support comprising a plurality of separate yielding sections whose faces form a substantially continuous work-supporting surface and holding means for said sections which permit some of them to yield independently of the others without destroying the continuity of said surface.

27. In a machine of the character described, a working member, and a bolster comprising a plurality of tilting sections, independent yielding supporting means for each section, and means connecting said sections for transmitting movement from one to another.

28. In a machine of the character described, a working member, and a bolster comprising a plurality of sections adapted to tilt and move bodily, independent yielding supporting means for each section, and means connecting said sections for transmitting tilting movement or bodily movement from one to another.

In testimony whereof I have affixed my signature, in presence of two witnesses.

ALEXANDER HEINRICH KEHRHAHN.

Witnesses:
    MARCUS B. MAY,
    P. W. PEZZETTI.